Patented Apr. 21, 1925.

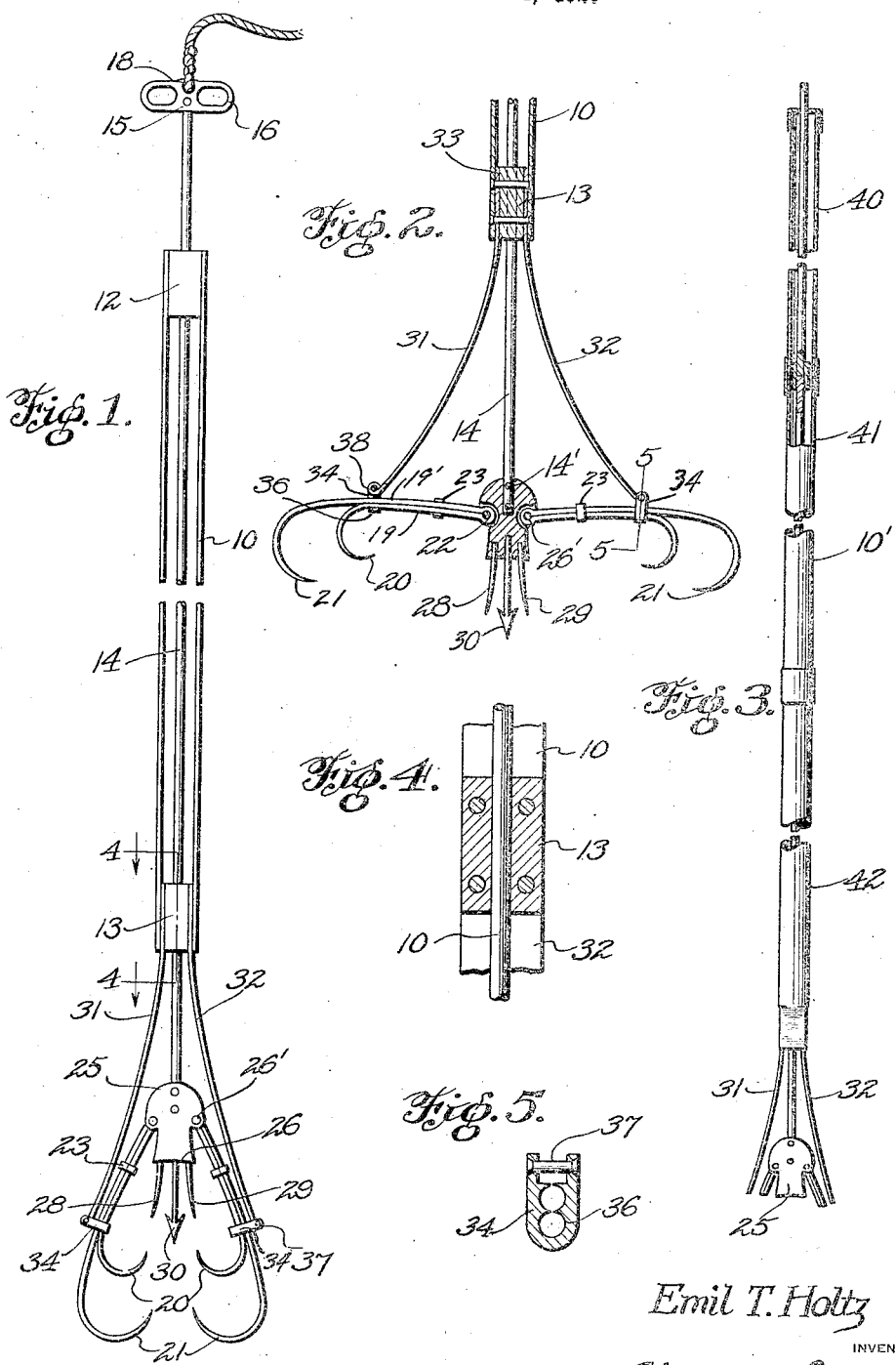

1,534,954

UNITED STATES PATENT OFFICE.

EMIL T. HOLTZ, OF SHELL LAKE, WISCONSIN.

GAFF HOOK.

Application filed October 4, 1923. Serial No. 666,583.

*To all whom it may concern:*

Be it known that I, EMIL T. HOLTZ, a citizen of the United States, residing at Shell Lake, in the county of Washburn and State of Wisconsin, have invented new and useful Improvements in Gaff Hooks, of which the following is a specification.

The object of this invention is to provide a device having the characteristics of a harpoon or spear, and a hook, the implement being adapted for the capture of fish and small game.

A further object is to provide a device of this type which shall include a plurality of hooks having their bills and points turned toward each other. with means for mounting these hooks in such manner that they serve as jaws, and a device for retaining and releasing the jaws.

A still further object is to provide, in such an implement, a slidable element controlling a trigger, pivoted spring-held jaws controlled by the trigger, and a spear or barbed member carried by the trigger and adapted to hold the game while the jaws are acting.

With the foregoing and other objects in view, the invention consists in the novel construction and arrangement of elements described and claimed, it being understood that modifications may be made within the scope of the claims without departing from the spirit of the invention.

In the drawings. Figure 1 shows the device in side elevation; Figure 2 is a detail view showing the hooks in open position; Figure 3 is a detail view, with parts broken away, and showing a tubular stock or handle, formed in sections this being a modification; Figure 4 is a section on line 4—4 of Figure 1; Figure 5 is a section of one of the clips used for connecting the springs with the hooks or jaws.

The stock or handle of the device may either be made of standard length as in the primary form, or may be made in sections as in the modification shown in the drawings, one section being detachable. The stock may also be made of tubular material, as illustrated. In Figure 1. the stock is designated 10 and is formed of metallic strips which may be each reinforced by longitudinal ribs, these strips being suitably connected with end pieces or blocks, of wood or metal, designated 12 and 13. The blocks are apertured centrally, and an operating rod 14 extends loosely therethrough. This rod is provided with a handle 15, having holes 16 therein, for the insertion of the fingers, so that longitudinal thrust may be imparted without engaging the fingers between the handle and the end member 12. An additional aperture 18 permits of the attachment of a line.

The hooks each include a double shank, formed of one piece of steel, the two shanks being shown at 19, 19'. The hooks per se are designated 20, 21, and are spaced from each other, and the two double hooks have their bills and points turned toward each other. At the extreme end of each double hook is an eye member 22, and the elements of the double shanks are connected by clips 23.

A trigger 25 is formed with an end 26 slightly concave, and is connected by pivots 26' with the double hooks, the pivots passing through the eyes 22. The trigger is further connected with the operating rod 14 by a pin or rivet 14', and two prongs 28, 29 extend from the outer end of the trigger, and are slightly curved, or made to diverge. Between these prongs a barbed point or spear 30 is located.

Springs 31, 32 are secured at 33, and are connected with the double hooks by clips 34, each formed with notched portions 36 which close around the shank portions of the respective hooks, the clips being secured to the springs by pins or rivets 37 passing through eyes 38 in these springs.

In the modification, illustrated in Figure 3 I have shown a shank, stock, or handle 10' formed in a plurality of detachable sections 40, 41, 42, and these sections may be of tubular form, if desired.

The size of the complete implement will vary according to the use to which it is to be put, but the same construction is adapted for large fish or small ones, and for the capture of small animals. In the smaller sizes of the device, the pointed members on the trigger need not exceed one or one and a half inches. In an important sense the double hooks constitute jaws because of the function thereof.

In setting the device, before it is thrown, the handle 15 is pushed toward the shank or stock 10, and when it engages the end member 12 the jaws will be retained in open position. The thrust imparted to rod 14 moves the trigger 25 outwardly and the jaws turn on their pivots at the ends of the springs 31, 32. The springs flex and the trigger passes a dead center, thereby holding the jaws open. When the implement is accurately thrown the pointed elements on the end of the trigger strike the game first, and the straight points cooperate with the barb in such manner that the fish or animal is held during the brief interval required for the jaws to snap together. This action is positive, and there is little chance of escape, during the interval mentioned. The springs tend to hold the jaws closed when sprung, and in cooperation with the bills of the hooks, make the device unusually effective.

What I claim is:

1. A device of the class described, comprising a main shank, a rod movable longitudinally thereof, a plurality of jaws, resilient devices for pivotally mounting the jaws and permitting them to swing toward and away from each other, and a combined spear and trigger connected with the rod and jaws and moving said jaws about their pivotal points, the ends of the jaw and spear being in opposed relation and approximately in alinement with the rod, when the jaws are closed.

2. In a device of the class described, comprising a shank, hook shaped jaws, springs pivotally mounting the jaws at points intermediate of their ends, the springs being connected with the shank, a trigger connecting corresponding ends of the jaws and pivoted thereto, a rod extending longitudinally of the shank and connected with the trigger, and spearing elements carried by the trigger, the rod, trigger and spearing elements being movable longitudinally with reference to the shank.

3. A device of the class described, comprising a shank, a rod slidable therethrough, a handle for the rod, springs extending in diverging relation from the end of the shank, hook shaped jaws pivoted to the outer ends of the springs, a device connecting the shank ends of the hook shaped jaws, and movable away from the shank beyond the pivotal points of the jaws, said connecting device being secured to the rod, and spearing elements carried by the connecting device.

In testimony whereof I affix my signature.

EMIL T. HOLTZ.